United States Patent [19]

Klinzing et al.

[11] Patent Number: 5,022,274
[45] Date of Patent: Jun. 11, 1991

[54] HIGH TEMPERATURE PARTICLE VELOCITY METER AND ASSOCIATED METHOD

[75] Inventors: George E. Klinzing; Luis A. Borzone, both of Pittsburgh; Wen-Ching Yang, Export, all of Pa.

[73] Assignee: University of Pittsburgh, Pittsburgh, Pa.

[21] Appl. No.: 468,367

[22] Filed: Jan. 22, 1990

[51] Int. Cl.$^5$ .................... G01F 1/56; G01F 1/708
[52] U.S. Cl. ..................... 73/861.04; 73/861.05; 73/861.08; 324/454
[58] Field of Search ........... 73/861.04, 861.05, 861.06, 73/861.08; 324/454, 464

[56] References Cited

U.S. PATENT DOCUMENTS

| | | |
|---|---|---|
| 3,588,699 | 6/1971 | Pysnik . |
| 3,595,078 | 7/1971 | Beck et al. ................. 73/861.06 X |
| 3,635,082 | 1/1972 | Preilwitz et al. . |
| 3,789,663 | 2/1974 | Gold . |
| 3,844,170 | 10/1974 | Critten . |
| 4,163,389 | 8/1979 | Suzuki ........................ 73/861.09 |
| 4,201,083 | 5/1980 | Kurita et al. . |
| 4,402,230 | 9/1983 | Raptis . |
| 4,483,199 | 11/1984 | Beiermann et al. . |
| 4,509,366 | 4/1985 | Matsushita et al. . |
| 4,512,200 | 4/1985 | Gehring et al. .............. 73/861.08 X |
| 4,774,453 | 9/1988 | Dechene et al. ............. 324/454 X |

FOREIGN PATENT DOCUMENTS 0261066 11/1987 Japan ..................... 73/861.08

*Primary Examiner*—Herbert Goldstein
*Attorney, Agent, or Firm*—Arnold B. Silverman; David V. Radack

[57] ABSTRACT

The high temperature particle velocity meter is comprised of a pair of spaced apart conducting portions having disposed on each of their upstream edges a first and second non-conducting portion. The bombardment of the particles on the conducting and non-conducting portions creates charged particles in the pneumatically transported material. These particles discharge an electric current through the conducting portions to respective conductors and then to respective signal generating means. The signal generating means convert the electric discharges to an electronic signal. The electronic signals from each of the signal generating means are fed into a calculating means which calculate the particle velocity of the material based on the respective electronic signals. In another embodiment, the device can be used in a ceramic pipeline or a metal pipeline having its inner surface ceramically lined. In this embodiment, the device does not include the non-conducting portions as the pipe is already non-conducting. An associated method is also disclosed for each type of pipeline.

34 Claims, 2 Drawing Sheets

HIGH TEMPERATURE PARTICLE VELOCITY METER AND ASSOCIATED METHOD

BACKGROUND OF THE INVENTION

1. Field Of The Invention:

This invention relates to a velocity flow meter and more particularly to an apparatus which measures the velocity of high temperature pneumatically transported solids.

2. Description Of The Prior Art:

An important operation in several industries is the pneumatic transport of solids. A crucial variable in the transportation of solids is the velocity of the particles in the pipeline. The velocity of the particles is needed to calculate energy losses and erosion of the transport lines. The problem is compounded when high temperature solids, such as hot ash products from combustion and coal gasification units, are transported.

A known method of calculating particle velocities is by using estimations from correlations. This involves determination of the terminal velocity of the particle and calculating the particle velocity as the difference between the gas velocity and the terminal velocity. Correlations, which are based on estimates, do not provide accurate actual measurements of particle flow velocities.

It is known to calculate the velocity of a fluid by measuring a property of the fluid at each of two points a known distance apart. See U.S. Pat. Nos. 4,509,366; 3,789,663 and 4,402,230.

It is also known to measure solid matter mass flow by providing an upstream set of electrical devices and a downstream set of electrical devices connected to circuits which provide a measurement of the velocity of the material. U.S. Pat. No. 3,635,082.

U.S. Pat. No. 4,483,199 discloses using radiation sources and detectors to calculate solid mass measurements.

Despite these known devices, there still remains a need for a particle velocity meter which is accurate and reliable and which can be used in association with transporting high temperature solids.

SUMMARY OF THE INVENTION

The present invention has met the above-described need. In one embodiment used for metal pipelines, the high temperature particle velocity meter is comprised of a pair of spaced apart conducting portions having disposed on each of their upstream edges a first and second non-conducting portion. The bombardment of the particles on the conducting and non-conducting portions creates charged particles in the pneumatically transported material. These particles discharge an electric current through the conducting portions to respective conductors and then to respective signal generating means. The signal generating means convert the electric discharges to an electronic signal. The electronic signals from each of the signal generating means are fed into a calculating means which calculate the particle velocity of the material based on the respective electronic signals.

In another embodiment, the device can be used in a ceramic pipeline or a metal pipeline having its inner surface ceramically lined. In this embodiment, the device does not include the non-conducting portions as the pipe is already non-conducting.

The method of the invention involves providing the appropriate device set forth hereinabove for the appropriate composition of pipeline, converting the electric discharges from the conducting portions into electronic signals and calculating the particle velocity of the material based on the electronic signals.

It is an object of the invention to provide a device and method for determining particle flow velocity of high temperature material.

It is a further object of the invention to use the apparatus in association with materials having temperatures over 100° C.

It is a further object of the invention to provide off-line flow velocity calculations.

It is a further object of the invention to calculate the velocity of pneumatically transported particles of coal, ash, oil shale, cement, mineral ore, and slag.

It is a further object of the invention to calculate the particle velocity using a digital oscilloscope.

It is a further object of the invention to provide an optional weight cell that can be used in conjunction with the device to create a solids flow meter usable with materials having a high temperature.

These and other objects will be more fully understood with reference to the description and to the drawings appended to this application.

DESCRIPTION OF THE PREFERRED EMBODIMENT

Figure 1:
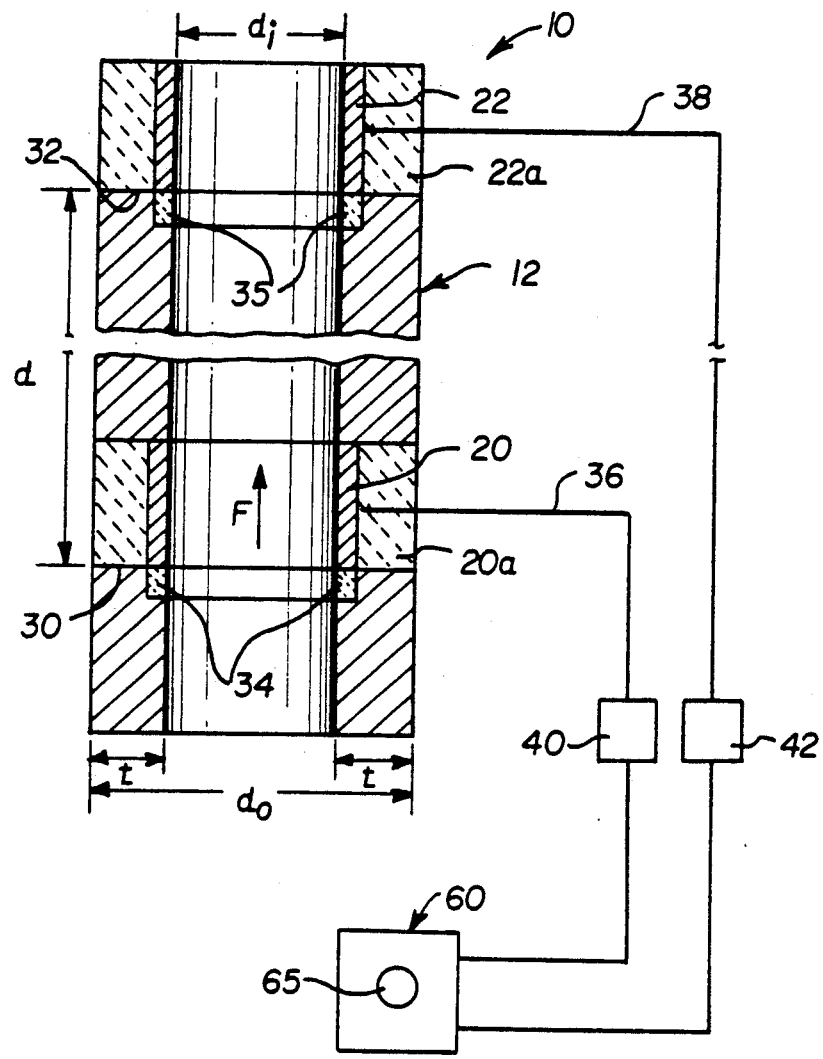
FIG. 1 is a partially schematic view of the apparatus of the invention.

FIG. 1 shows a partially schematic diagram of the device 10 of the invention as placed in a pipeline 12. The pipeline 12 shown in FIG. 1 is made of metal. The device 10 is usable with metal pipelines carrying high temperature materials. "High temperature" is defined as any solid material having a temperature between 100° C. and 1000° C. Thus, the pipeline 12 can pneumatically transport high temperature solid materials such as ash, oil shale, cement, mineral ore, and slag for example.

The pipeline 12 shown has an outer diameter, $d_o$, of 4 inches and an inner diameter, di, of 2 inches, which forms a pipeline wall thickness, t, of about 1 inch. pipeline 12 would be suitable for conveying ash, oil shale, cement, mineral ore, and slag at flow velocities of about 15 ft./sec. to 200 ft./sec. The flow direction in the pipeline 12 is indicated by the arrow.

A pair of spaced apart conducting probe rings 20 and 22 are embedded in the inner surface of the pipeline 12. The section of the pipeline 12 where the rings 20 and are embedded is made of a refractory material 20a and 22a. These probe rings 20 and 22 are electrically conductive and are preferably made of carbon steel but can also be made of stainless steel, copper or brass, for example. The probe rings 20 and 22 are about 1.5 inches in length and have a similar inner diameter as the inner diameter of the pipeline 12. This will facilitate proper flow of the material past the carbon steel rings 20 and 22 and will also insure that there is not erosion of the probes 20 and 22.

The probe rings 20 and 22 are positioned in a spaced apart manner, with probe ring 20 being upstream from probe ring 22. The direction of flow of the material through the pipeline is indicated by arrow "F". The distance "d" between the rings 20 and 22 is about 2 feet, measured from the upstream end 30 of ring 20 to the upstream end 32 of ring 22. If preferred, a series of rings can be used to measure a range of velocities. It will be appreciated that each ring should be preceded by a non-conducting surface. An embodiment having a series of rings is discussed hereinafter with relation to FIG. 3.

Disposed on the upstream end 30 and 32 of each probe ring 20 and 22, respectively, are respective non-conducting ceramic portions 34 and 35. Each of these ceramic portions 34 and 35 is also in the shape of a ring. The purpose of these ceramic portions 34 and 35 will be discussed hereinbelow. The ceramic portions 34 and 35 are also embedded in the pipeline 12. The length of the ceramic portions 34 and 35 depends on the metallic composition of the pipeline 12, among other things. In some cases, the entire distance between the metal probe rings 20 and 22 will be provided with a ceramic portion.

The probe rings 20 and 22 are connected by conductors 36 and 38 to respective electrometers 40 and 42. It is preferred to use copper conductors as these will most efficiently drain the electrical charge from rings 20 and 22. The electrometers 40 and 42 are usually placed a few feet from the probe rings 20 and 22, however shielded copper cable can be used as the conductors to facilitate greater distances between the probe rings 20 and 22 and the respective electrometers 40 and 42. The electrometers 40 and 42 used can be electrometers manufactured by the Keithley Company and sold under the trade designation "610C".

The electrometers 40 and 42 take the charged transferred by the particles flowing in the pipeline 12 from the probe rings 20 and 22 and convert this into an output voltage which is then measured by digital oscilloscope 60.

The electrometers 40 and 42 transmit an electronic signal to a digital oscilloscope 60. The digital oscilloscope 60 is dual trace, dual input unit and provides a means of measuring the distance between similar signal peaks for obtaining the lag time for the particle velocity. The digital oscilloscope has a display 65 which will be discussed in connection with FIG. 2. Other means can be used to obtain the particle velocity, such as a system consisting of a strip chart recorder, analog to digital converter and a computer. FIG 3, where like parts to that of FIG. 1 have like reference numbers, shows probe rings 80 and 81 positioned in a spaced apart manner with probe ring 80 being upstream from probe ring 81. Additionally, probe rings 80 and 81 are positioned upstream from probe rings 20 and 22. Disposed on the upstream end 82 and 83 of the probe rings 80 and 81, respectively, are non-conducting ceramic portions 84 and 85. The probe rings 80 and 81 are connected by conductors 86 and 87 to respective electrometers 88 and 89. The electrometers 88 and 89 transmit an electronic signal to digital oscilloscope 60. The signals are then processed similarly as the signals from electrometers 40 and 42, as was described hereinabove. In this way, a range of particle velocities can be measured.

An optional weigh cell 70 can be used in association with the device. The weigh cell can be used to calibrate the particle velocity and thus the device can also be used as a solids flow meter. As is well known, a weigh cell is operatively associated with the material container of a pneumatic conveying system of which the invention can be a part. The material container holds the materials to be conveyed and introduces the material into the pipeline 12 for subsequent pneumatic conveying. The weigh cell measures the weight of the material accumulated in the container and is capable of recording weight change over time. The weigh cell operates under the principle of strain developed by the weight of an object on a strain gauge. By recording the weight in the container at a first time and then a second time, the changes in the weight of the container divided by the interval of time between the first time and second time will give the mass flow rate of the material. The weigh cell is used to calibrate the particle velocity and thus the invention can also be used as a solids flow meter.

In use, when a solid is pneumatically transported, particles will first bombard the non-conducting ceramic portion 34 and then probe ring 20. Because of the different conducting surfaces of the non-conducting portion 34 and probe ring 20, a triboelectric charge in the particles is created. Triboelectric charge is a natural phenomena of surface charge transfer between solids having different surface energies. This triboelectric charge is picked up first by probe ring 20 and then probe ring 22. This action will cause the probe rings 20 and 22 to emit electrical discharges which in turn will be delivered through conductors 36 and 38 to electrometers 40 and 42.

The two electrometers 40 and 42 convert the electrical discharges into electronic signals which are delivered to the digital oscilloscope 60. The digital oscilloscope 60 will display the two separate tracings of the electrically charged particles on screen 65.

Figure 2:
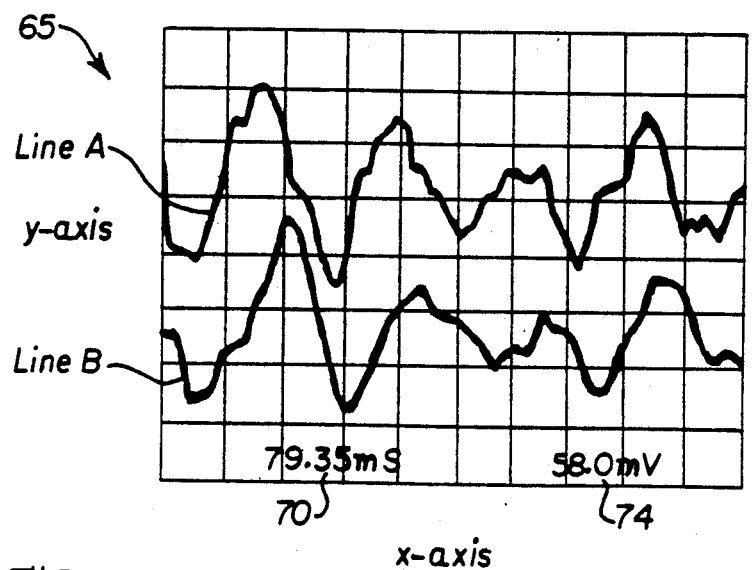
FIG. 2 is an oscilloscope trace of the electronic signals and a display of the velocity, current and voltage of the electrically charged particles in the solid material flowing in the refractory pipe.
Figure 3:
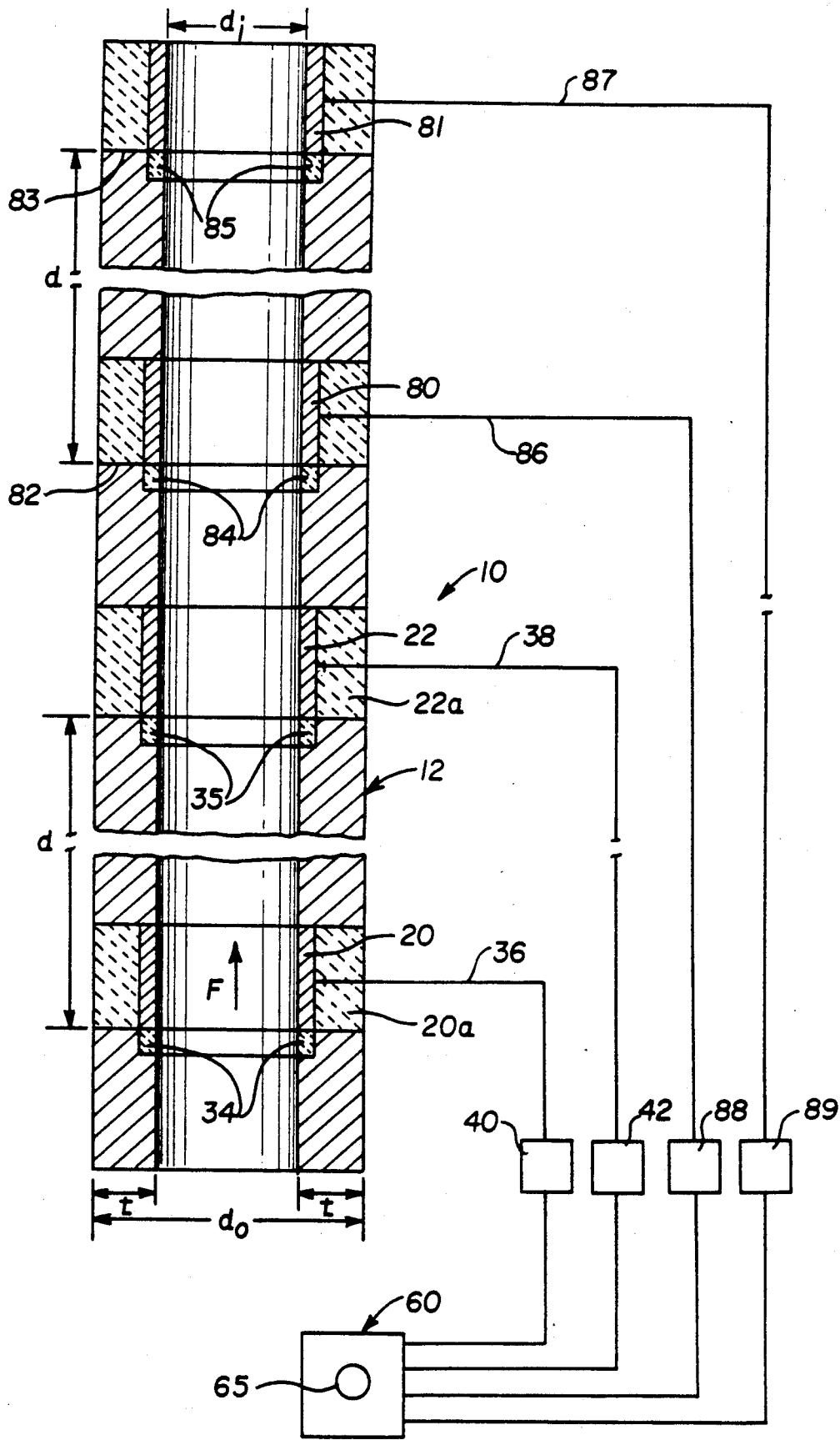
FIG. 3 is a partially schematic view of an alternate embodiment of the invention.

The display 65 can be seen by observing FIG. 2. The y-axis indicates voltage output and the x-axis is time. Line A indicates the tracing of the particles that strike carbon steel ring 20 and Line B indicates the tracing of the particles that strike carbon steel ring 22. The velocity of the particles is calculated by dividing the time between the displaced peaks into the distance between the probe rings 20 and 22. The time scale for each division is displayed on the oscilloscope screen as at 70. The voltage scale for each division is also displayed as at 74.

An alternate method of measuring the particle velocity involves a cross-correlation technique. The signals from the electrometers 40 and 42 can be fed into a cross-correlation device, and either electronically or by computer, the cross-correlation is performed between the two signals to determine the delay time over a much wider sampling time. The cross-correlation involves multiplying the two signals and integrating the equation over time to obtain an output that will be maximized at the point where the lag time exists between the signals. In the case of a computer application, the analog to digital converter employed for the two signals samples the two signals at precisely the same time.

It will be appreciated that the device can also be used in connection with ceramic pipelines and metallic pipelines having a ceramically created inner surface. In this case, non-conducting ceramic portions 34 and 35 are not required because ceramic and ceramic lined pipes have the requisite non-conducting surface adjacent to the conducting portion to create the triboelectric charge. The remainder of device 10 is the same in this embodiment for the ceramic and ceramic lined pipe as it is in the metallic pipeline embodiment shown in FIG. 1.

The method of the invention involves generating a first and second electric discharge by some of the electrically charged particles in the material striking a first electrically conductive portion and then a second electrically conductive portion which is spaced from the first electrically conductive portion. The first and second electric discharges are converted into electronic signals and the particle flow velocity is calculated based on the first and second signals.

It will be appreciated that an apparatus and method of measuring the flow velocity of high temperature solids is provided which is reliable and accurate.

Whereas particular embodiments of the invention have been described hereinabove, for purposes of illustration, it will be evident to those skilled in the art that numerous variations of the details may be made without departing from the invention as defined in the appended claims.

We claim:

1. A device for measuring the particle velocity of a pneumatically transported high temperature material comprising:
   pipeline means for holding said high temperature material;
   a first electrically conducting portion disposed on the inner surface of said pipeline means, said first electrically conducting portion having an upstream end and a downstream end;
   a first electrically non-conducting portion disposed on the inner surface of said pipeline, said first electrically non-conducting portion positioned adjacent to said upstream end of said first electrically conducting portion, to create a first triboelectric charge when said high temperature material contacts said first electrically non-conducting portion, said first triboelectric charge being discharged when said material subsequently contacts said first electrically conducting portion;
   a second electrically conducting portion disposed on the inner surface of said pipeline and spaced apart form said first electrically conducting portion, said second electrically conducting portion having an upstream end and a downstream end;
   a second electrically non-conducting portion disposed on the inner surface of said pipeline, said second electrically non-conducting portion positioned adjacent said upstream end of said second electrically conducting portion to create a second triboelectric charge when said high temperature material contacts said second electrically non-conducting portion, said second triboelectric charge being discharged when said material subsequently contacts said second electrically conducting portion;
   first signal generating means to receive said first triboelectric charge;
   first conductor means to carry said first triboelectric charge from said first electrically conducting portion to said first signal generating means;
   second signal generating means to receive said second triboelectric charge;
   second conductor means to carry said second triboelectric charge from said second electrically conducting portion to said second signal generating means;
   said first signal generating means converting said first triboelectric charge from said first electrically conducting portion into a first electronic signal;
   said second signal generating means converting said second triboelectric charge from said second electrically conducting portion into a second electronic signal; and
   means for calculating the particle velocity of said high temperature material based on said first electronic signal and said second electronic signal.

2. The device of claim 1, including
a third non-conducting portion disposed on the inner surface of said pipeline and positioned adjacent said downstream edge of said first conducting portion.

3. The device of claim 2, wherein
said second and third non-conducting portions form a continuous non-conducting portion between said first conducting portion and said second conducting portion.

4. The device of claim 3, wherein
said first and second conducting portion are made of a material selected from the group consisting of carbon steel, stainless steel, copper and brass.

5. The device of claim 4, wherein
said first, second and third non-conducting portions are made of a ceramic material.

6. The device of claim 5, wherein
said first and second conducting portions are rings embedded in the inner surface of said pipeline, whereby the positioning of said conducting portions does not influence the overall flow behavior of the particles in said material through said pipeline and whereby said conducting portions are less subject to erosion.

7. The device of claim 6, wherein
said first, second and third non-conducting portions are rings embedded in the inner surface of said pipeline, whereby the positioning of said non-conducting portions does not influence the overall flow behavior of the particles in said material through said pipeline and whereby said non-conducting portions are less subject to erosion.

8. The device of claim 7, wherein
said first and second conductors are made of copper.

9. The device of claim 7, wherein
said first and second conductors are shielded copper cables.

10. The device of claim 8, wherein
said calculating means is a digital oscilloscope.

11. The device of claim 8, wherein
said calculating means is a strip chart recorder connected to an analog to digital converter and a computer.

12. The device of claim 1, including
a weigh cell in association with said device, whereby through calibration of said particle velocity through said weigh cell said device ca be used as a solids flow meter.

13. The device of claim 1, including
a plurality of additional conducting portions spaced apart from said first conducting portion, each said conducting portion having a non-conducting portion positioned along its upstream edge, whereby a range of particle velocities can be measured.

14. A device for measuring the particle velocity of a pneumatically transported high temperature material comprising:
   pipeline means having an electrically non-conducting inner surface for holding said high temperature material and for creating first and second triboelectric charges;

a first electrically conducting portion disposed on the inner surface of said pipeline means, said first electrically conducting portion having an upstream end and a downstream end, whereby a first triboelectric charge is created when said high temperature material contacts said pipeline means upstream of said first electrically conducting portion, said first triboelectric charge being discharged when said material subsequently contacts said first electrically conducting portion;

a second electrically conducting portion disposed on the inner surface of said pipeline and spaced from said first electrically conducting portion, said second electrically conducting portion having an upstream end and a downstream end, whereby a second triboelectric charge is created when said high temperature material contacts said pipeline means upstream of said second electrically conducting portion, said second triboelectric charge being discharged when said material subsequently contacts said second electrically conducting portion;

a first signal generating means to receive said first triboelectric charge;

first conductor means to carry said first triboelectric charge from said first electrically conducting portion to said first signal generating means;

second signal generating means to receive said second triboelectric charge;

second conductor means to carry said second triboelectric charge from said second electrically conducting portion to a second signal generating means;

said first signal generating means converting said first triboelectric charge from said first electrically conducting portion into a first electronic signal;

said second signal generating means converting said second electric signal from said second electrically conducting portion into a second electronic signal; and means for calculating the particle velocity of said high temperature material based on said first electronic signal and said second electronic signal.

15. The device of claim 14, wherein
said first and second conducting portion are made of a material selected from the group consisting of carbon steel, stainless steel, copper and brass.

16. The device of claim 15, wherein
said first and second conducting portions are rings embedded in the inner surface of said pipeline, whereby the positioning of said conducting portions does not influence the overall flow behavior of the particles in said material through said pipeline and whereby said conducting portions are less subject to erosion.

17. The device of claim 16, wherein
said first and second conductors are made of copper.

18. The device of claim 16, wherein
said first and second conductors are shielded copper cables.

19. The device of claim 17, wherein
said calculating means is a digital oscilloscope.

20. The device of claim 17, wherein
said calculating means is a strip chart recorder connected to an analog to digital converter and a computer.

21. The device of claim 14, including a weigh cell in association with said device, whereby through calibration of said particle velocity through said weigh cell said device can be used as a solids flow meter.

22. The device of claim 14, including
a plurality of additional conducting portions spaced apart from said first conducting portion, each said conducting portion having a non-conducting portion positioned along its upstream edge, whereby a range of particle velocities can be measured.

23. A method of determining the particle velocity of a high temperature material being pneumatically transported in a metal pipeline and the like comprising:

providing said pipeline with a first electrically conducting portion and a second electrically conducting portion, said portions having disposed on each of their upstream sides respective first and second electrically non-conducting portions, and (ii) a first and second conductor for carrying electric discharges from said first and second conducting portions, respectively, to a first and second signal generating means;

pneumatically conveying through said pipeline said high temperature material to create (i) a first triboelectric charge on said material when said material contacts said first electrically non-conducting portion, said first triboelectric charge being discharged when said triboelectrically charged material contacts said first electrically conducting portion and (ii) a second triboelectric charge on said material when said material contacts said second electrically non-conducting portion, said second triboelectric charge being discharged when said triboelectrically charged material contacts said second electrically conducting portion;

converting said first and second triboelectric charge to respective first and second electronic signals by means of said first and second signal generating means, respectively; and calculating said high temperature particle velocity based on said first and second electronic signals.

24. The method of claim 23, wherein
calculating said particle velocity by the separation distance between said first and second conducting portions and the time lag between said particles striking said first conducting portion and said second conducting portion.

25. The method of claim 24, wherein
employing a digital oscilloscope to calculate said velocity.

26. The method of claim 23, wherein
calculating said particle velocity by a crosscorrelation technique, whereby said electronic signals are multiplied and integrated over time to obtain an output that will be maximized at the point where the lag time exists between said electronic signals.

27. The method of claim 26, wherein
employing a strip chart recorder, an analog to digital converter and computer to calculate said particle velocity.

28. The method of claim 23, wherein
employing as said material oil, oil shale, cement, mineral ore or slag having a temperature of between 100° C. and 1000° C.

29. A method of determining the particle velocity of a high temperature material being pneumatically transported in a ceramic pipeline having an electrically nonconducting inner surface comprising:

providing said pipeline with a first electrically conducting portion and a second electrically conducting portion, and (ii) a first and second conductor for carrying electric discharges form said first and second conducting portions, respectively, to a first and second signal generating means;

pneumatically conveying through said pipeline said high temperature material to create (i) a first triboelectric charge on said material when said material contacts said pipeline, said first triboelectric charge being discharged when said triboelectrically charged material contacts said first electrically conducting portion and (ii) a second triboelectric charge on said material when said material contacts said pipeline, said second triboelectric charge being discharged when said triboelectrically charged material contacts said second electrically conducting portion;

converting said first and second triboelectric charge to respective first and second electronic signals by means of said first and second signal generating means, respectively; and calculating said high temperature particle velocity based on said first and second electronic signals.

30. The method of claim 29, wherein
calculating said particle velocity by the separation distance between said first and second conducting portions and the time lag between said particles striking said first conducting portion and said second conducting portion.

31. The method of claim 30, wherein
employing a digital oscilloscope to calculate said velocity.

32. The method of claim 29, wherein
calculating said particle velocity by a crosscorrelation technique, whereby said electronic signals are multiplied and integrated over time to obtain an output that will be maximized at the point where the lag time exists between said electronic signals.

33. The method of claim 32, wherein
employing a strip chart recorder, an analog to digital converter and computer to calculate said particle velocity.

34. The method of claim 29, wherein
employing as said material oil, oil shale, cement, mineral ore or slag having a temperature of between 100° C. and 1000° C.

* * * * *

UNITED STATES PATENT OFFICE
CERTIFICATE OF CORRECTION

PATENT NO. : 5,022,274

DATED : June 11, 1991

INVENTOR(S) : GEORGE E. KLINZING ET AL.

It is certified that error appears in the above-identified patent and that said Letters Patent is hereby corrected as shown below:

Column 2, line 58, --22-- should be inserted after "and".

Claim 1, column 5, line 41, "form" should be --from--.

Claim 12, column 6, line 54, "ca" should be --can--.

Signed and Sealed this

Eighth Day of December, 1992

Attest:

DOUGLAS B. COMER

Attesting Officer

Acting Commissioner of Patents and Trademarks